UNITED STATES PATENT OFFICE.

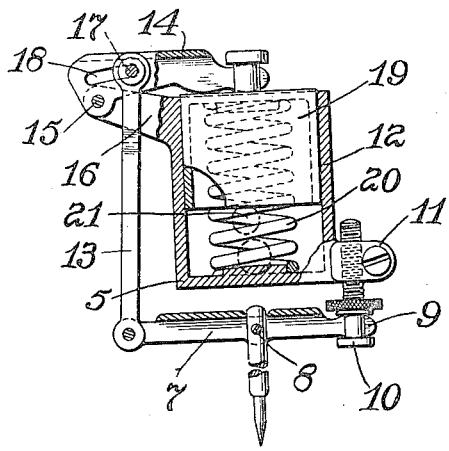
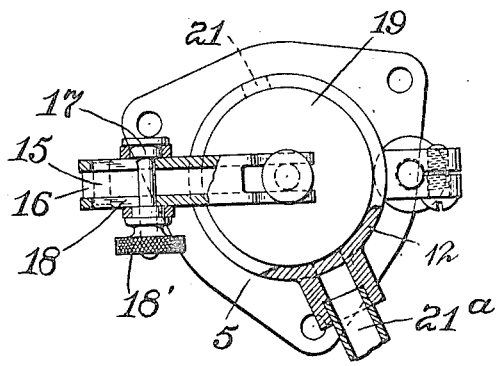
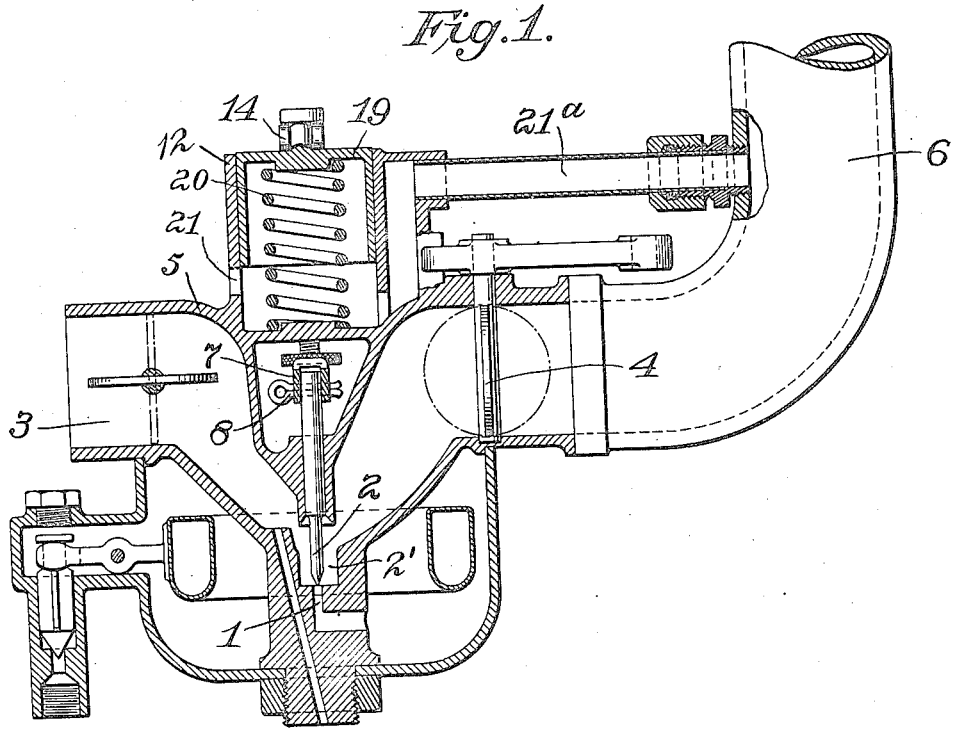

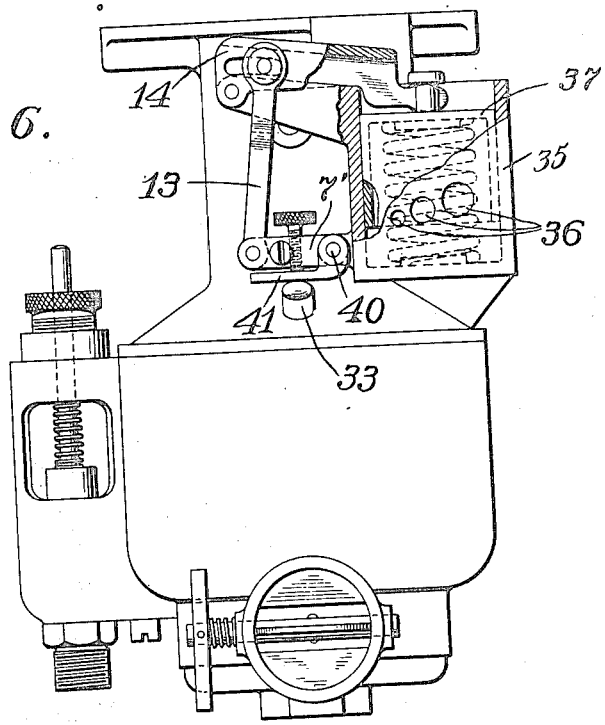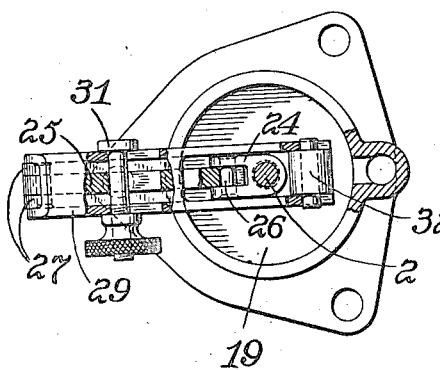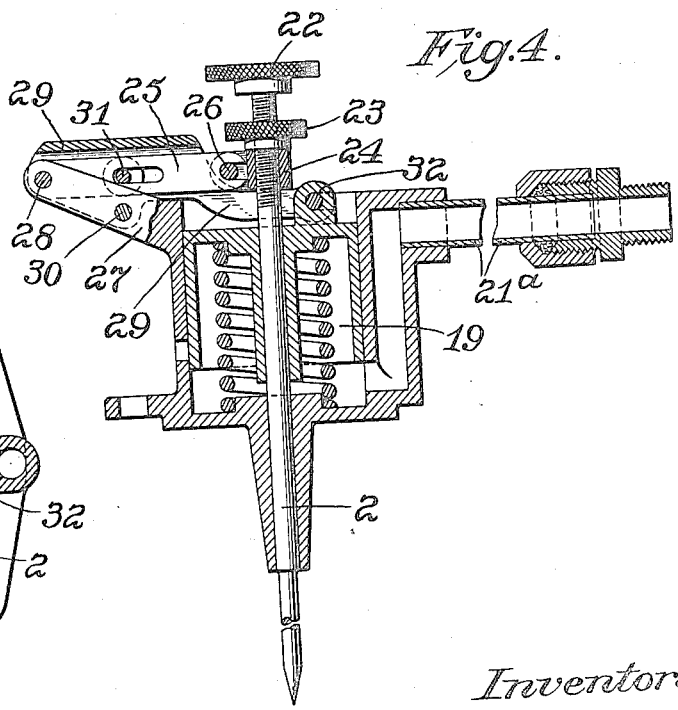

JOHN VODICKA AND ADOLPH F. YOUNG, OF CHARLEVOIX, MICHIGAN, ASSIGNORS TO EUREKA CARBURETTER CO., OF CHARLEVOIX, MICHIGAN, A CORPORATION OF MICHIGAN.

CARBURETER.

1,229,683.    Specification of Letters Patent.    Patented June 12, 1917.

Application filed January 6, 1916. Serial No. 70,642.

*To all whom it may concern:*

Be it known that we, JOHN VODICKA and ADOLPH F. YOUNG, citizens of the United States, residing at Charlevoix, Michigan, have invented certain new and useful Improvements in Carbureters, of which the following is a specification.

Our invention concerns means for controlling the supply of air and gasolene in proper proportions to meet the requirements of the load and one feature of the invention pertains to a fuel valve arrangement by which the said valve is in initially open position for starting and is controlled, as to its changes in position, by the varying suction pressure or pull existing in the manifold, that is, at a point between the throttle valve and the engine, which suction tends to close said valve. We also employ an auxiliary air intake valve or regulating member which is controlled by the said suction pressure or pull existing in the manifold at the point stated, this suction, as in the case of the fuel valve tending to close the auxiliary air intake and acting in opposition to the normal tendency of the air intake valve or regulating member and the fuel valve to remain open. This suction pull exerted upon the auxiliary air regulating means and the fuel valve varies in degree inversely to the degree of open position of the throttle valve or the supply of air through the main air intake and it varies also during the running of the engine, according to the load imposed thereon, the said controlling mechanism, comprising the auxiliary air and fuel valves, accommodating itself within certain limits to the requirements of the work being done.

Other features of the invention will be described hereinafter.

The invention consists in the features and combination and arrangement of parts hereinafter described and particularly pointed out in the claims.

In the drawings:

Figure 1 is a sectional view of the invention with parts in elevation.

Fig. 2 is a detail plan view.

Fig. 3 is a view of part of Fig. 1 a quarter turn therefrom.

Figs. 4 and 5 show a sectional and a plan view of a modification.

Figs. 6, 7 and 8 are views of another modification.

Figure 7:
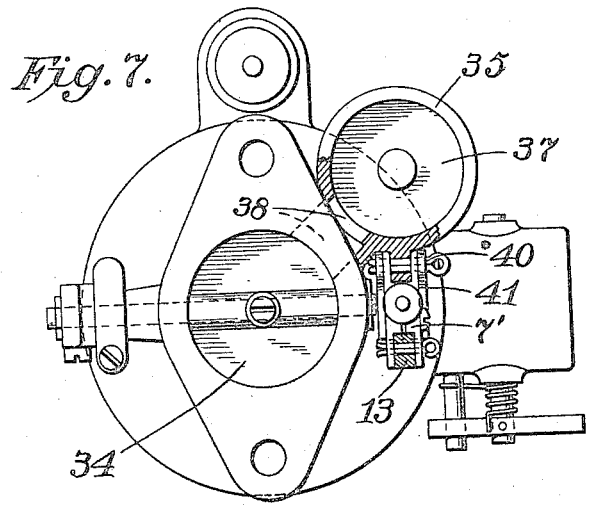

In these drawings, 1 indicates a fuel inlet, to which the oil is supplied in ordinary manner by a float controlled valve. 2 is the needle valve controlling the intake of fuel. This valve is surrounded by a well 2' containing oil. 3 is the main air inlet from which the air is directed past the fuel valve to have an aspirating action in taking up and carrying along the gas. 4 is the throttle valve, all these parts being located in a casing 5 in substantially the well known manner. The manifold is represented at 6. The needle valve stem extends up through the wall of the casing and is connected pivotally at a point 8, outside the same with a lever 7 fulcrumed at 9 between the collars or heads of a screw 10 mounted in the ear 11 on the cylinder 12. The other end of the lever 7 is pivotally connected to a link 13, the upper end of which is connected adjustably with an arm or lever 14 pivoted at 15 in an ear or bracket 16 extending from the cylinder wall or frame, the said adjustable connection being formed by the pivot pin or screw 17 of the link passing through a slot 18 in the lever, said pin or screw being held in any position to which it may be adjusted by a clamp nut 18'. The range of adjustment of the upper end of the link is such that in one position the pivot 17 of the link will coincide substantially with the pivot 15 of the lever 14, but in other positions the connecting point will be at different distances from the pivot.

The lever 14 has a forked end engaging under a headed pin or projection on a controller member 19 in the form of a piston working in the cylinder, and pressed in one direction by a spring 20, this spring lifting the piston to open the fuel valve through the lever 14, link 13 and lever 7 when the link is properly adjusted in the slot 18 to derive the desired degree of movement from the piston. This piston also serves as a valve for controlling the auxiliary air intake opening 21 formed through the wall of the cylinder, this auxiliary air passing through a suitable port, conduit or pipe 21ᵃ to the manifold at a point between the throttle valve and the engine, this arrangement constituting one important feature of our invention, furnishing as it does an auxiliary air supply and also providing a suction connection beyond the throttle valve, through which the suction pull or suction pressure in the manifold will exert control upon the piston 19, which in turn controls the auxiliary air intake and the fuel valve.

The fuel valve is initially set in wide open position and for this purpose the lever 7 at its fulcrum is adjusted up or down by means of the screw 10. Having adjusted this screw to determine the wide open position of the valve, the spring in the piston chamber, acting on said piston 19, will maintain the fuel valve in its wide open position at first for starting the engine and until such time as the suction pull overcomes the pressure of the spring and draws the piston downwardly.

By adjusting the link at its upper end along the arm or lever 14, different degrees of movement may be imparted to the fuel valve through said link and the lever 7 from the movement of the piston, this adjustment determining the position of the fuel valve for high speed, while the adjustment of the lever 7 determines the wide open position of the valve for low speed or starting. When the carbureter is properly adjusted at no time will the needle valve be fully closed.

The operation is as follows:

We will suppose that the fuel valve operating lever 7 has been adjusted to determine the desired wide open position of the fuel valve for starting or for low speed, and it is desired to run the engine; at this time, while the engine is at rest, the spring in the piston chamber has raised the piston and the fuel valve is as wide open as the adjustment just mentioned will permit. The operator now opens the throttle valve a little and upon cranking or starting the engine air will rush in through the main air intake and by its aspirating effect will carry along with it a supply of the fuel from the oil well 2' at the valve which at first is wide open.

This rich mixture will flow past the throttle valve and into the manifold and engine to furnish the supply for the first explosion in starting the engine. This same suction action will become effective on the piston in the controlling chamber and will draw the same down and cut off the inlet of air through the auxiliary air port and it will also partly close the fuel inlet valve, and so long as the throttle valve is held in this position, i. e. opened a little way for running at a low speed, the parts will remain substantially in this position, the air being drawn in through the main intake only past the fuel valve and forming therewith the desired mixture to be delivered to the engine. The cutting off of the auxiliary air prevents the mixture from being thinned or rendered lean at this time.

When the speed is to be increased or the engine is to carry a greater load, the throttle valve is opened wider and consequently the air entering the main intake meeting less obstruction to its free passage for supplying the vacuum created by the suction, will flow in the main air intake in greater volume, thereby reducing the suction action on the piston 19 and allowing the spring to raise the piston and partially or fully open the auxiliary air intake in accordance with the working of the engine and also the fuel valve, so that more fuel will be supplied and also more air, that which passes through the more widely open throttle valve being augmented by that which passes through the auxiliary air intake, the latter thinning the mixture in the manifold beyond the throttle valve and before it reaches the explosion chamber.

The suction on the piston from the manifold, caused by the operation of the engine, becomes effective in accordance with the opening and closing of the throttle valve, that is, the wider open the throttle valve the less suction there will be on the controller piston and the more auxiliary air and the more fuel will be supplied and the inverse of this is true in a corresponding degree on the closing movement of the throttle valve.

Upon opening the throttle valve, the main air supply, the auxiliary air supply, and the fuel supply all will be increased, so that while the engine is running the operation of the throttle will control the supply of air and gas, as the operator may deem proper to meet the requirements of the load, both air and gas being supplied in greater amount when the throttle is open and in lesser amount when the throttle is closed. It will be seen, however, that the control upon the auxiliary air and the fuel valve is exerted indirectly through the throttle and by the employment of the suction connection between the piston chamber 12 and the manifold at a point intermediate the throttle valve and engine.

By our invention, when starting the engine, we are enabled to have the fuel valve open wide at first and thereby get a rich mixture at the proper time and after starting the engine the fuel valve and the auxiliary air are controlled by the piston working automatically and the proper mixture is produced to meet the demand of the engine accordingly as the throttle is more or less opened.

As illustrating the fact that our invention may be embodied in different forms, we refer to Figs. 4 and 5 in which the adjustment of the fuel valve may be secured by threading the upper end of the stem and turning it by means of the finger piece 22, through the jamb nut 23 which bears on the block 24 to which the lever 25 is pivotally connected at 26 at its forked end. This lever is pivoted to the frame bracket or ear 27 at 28, and it is operated by the arm or lever 29, pivoted to the ear at 30 and connected to the lever 25 by an adjustable clamp pin or screw 31 which passes through a slot in both levers. The lever 29 is connected with the piston pivotally at 32. By adjusting the pin or screw 31 different degrees of movement can be imparted to the lever 25 and needle valve from the movement of the lever 29. In this form the needle valve passes through the controller piston 19.

Figure 8:
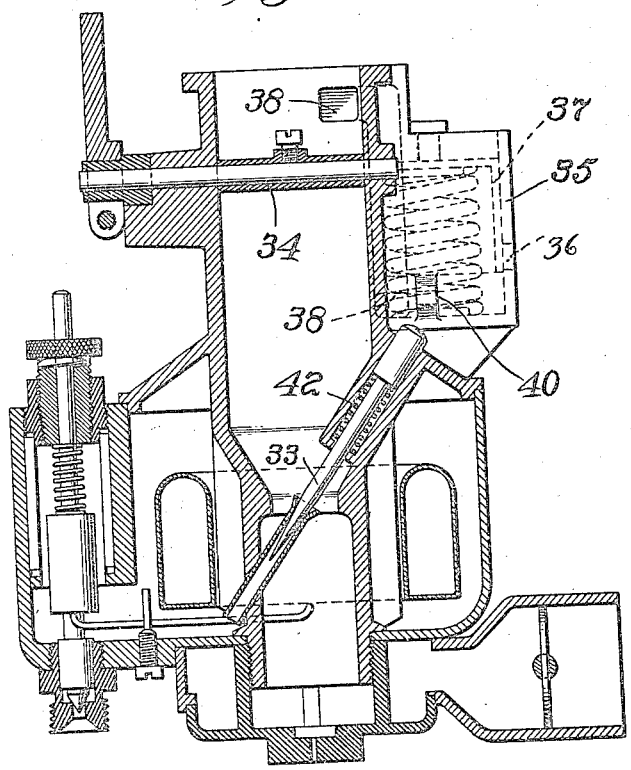

As showing that the invention may be embodied in another and different organization of parts from those above described reference is made to Figs. 6, 7 and 8, this being adapted for use with larger automobiles than the form above described.

In this case the needle valve 33 is arranged at an inclination to the main air intake. The throttle valve is arranged at 34. The cylinder 35 forms a part of the main casing. The auxiliary air ports in cylinder 35 are shown at 36, the piston or auxiliary air valve at 37, and the port or passage connecting with the manifold above the throttle valve is at 38, this communicating with the space below the piston for the passage of the auxiliary air when the piston is raised. The lever 14 operated by the piston is about the same as that first described, as is also the link 13 adjustably connected with said lever. At the lower end this link is connected to an arm 7' pivoted at 40 to the casing and it carries a screw bearing upon the arm or finger 41 pivoted at 40 and bearing upon the needle valve so that by turning the screw the needle valve may be adjusted as described it being understood that the needle valve in this case is pressed up by a separate spring 42.

It will be understood that we do not restrict ourselves to the combination in one apparatus of the auxiliary air and the fuel control nor to exerting the control or both of these through an element common to them both.

The controlling mechanism hereinbefore described will accommodate itself, within certain limits, to the requirements of the load imposed on the engine, without alteration of the adjustment of the throttle valve, this result flowing from the fact that the suction pull through the by-pass port or conduit 21ª exerted on the controller piston tends to close the auxiliary air port and the fuel valve and when this suction pull is reduced the controller piston, under the action of the spring, will open more or less. Therefore, upon an increase of the load on the engine piston, and its slowing down, the suction pull will be reduced on the controller piston and this will rise letting in more auxiliary air and more fuel to supply the needs of this extra load.

We claim:—

1. In combination, in a carbureter, a throttle valve, a fuel valve, an air intake directing the air past the fuel valve, means for holding the fuel valve open initially and means in connection, independently of the main air inlet, with the manifold beyond the throttle valve for moving the fuel valve toward closed position under the action of the suction existing in the connection between the throttle valve and the engine, substantially as described.

2. In combination, in a carbureter, a throttle valve, a main air intake, a fuel valve, an auxiliary air intake between the throttle and the engine and means subjected to the suction in the connection between the throttle and the engine for controlling the fuel inlet valve and the auxiliary air intake, in accordance with the regulation of the throttle, substantially as described.

3. In combination, in a carbureter, a throttle valve, a main air intake, a fuel valve, an auxiliary air intake, said fuel valve and auxiliary air intake being initially open, and means for controlling the fuel valve and the auxiliary air intake, said means, for closing said auxiliary air intake and fuel valve being subjected to the suction pressure existing between the throttle valve and the engine, substantially as described.

4. In combination a throttle valve, a main air intake, a fuel valve past which the main air is directed, an auxiliary air intake connected with the manifold between the throttle and the engine, and means subjected to the suction of the air passing through the auxiliary air intake to the manifold beyond the throttle valve, said means having a closing action on the auxiliary air intake and the fuel valve under the suction existing in the manifold beyond the throttle valve, substantially as described.

5. In combination, a throttle valve, a fuel valve, an air intake directing the air past the fuel valve, means for operating the fuel valve automatically, including a member subjected to the suction of the engine and closing under said suction, said means including an adjustment for setting the fuel valve in open position for low speed, substantially as described.

6. In combination a throttle valve, a fuel valve, a spring for holding said fuel valve open initially, a cylinder connected with the suction pipe between the throttle valve and the engine, and means in said cylinder connected to the fuel valve for giving the same closing movement under the pull of said suction against the pressure of said spring, substantially as described.

7. In combination, a throttle valve, a fuel valve, a cylinder having an auxiliary air inlet, a conduit or port by which said cylinder communicates with the manifold between the throttle and the engine, a piston in said cylinder, connected to the fuel valve and controlling the auxiliary air inlet, a spring acting upon the piston to open both the fuel and auxiliary air inlets, said piston having a closing action when the suction from the manifold beyond the throttle valve reaches a certain degree, substantially as described.

8. In combination, a fuel valve, a throttle valve, a main air intake, a piston, a cylinder, a suction connection from the cylinder to the manifold at a point between the throttle valve and the engine, said piston and cylinder controlling the inlet of auxiliary air to the manifold beyond the throttle valve, a spring for forcing the piston one way, said piston giving the fuel valve a movement in the other direction when pulled by the suction and adjustable connections between the piston and the fuel valve for closing the latter by the suction initiated movement of the piston.

9. In combination, a fuel valve, a throttle valve, a main air intake, a piston, a cylinder, a suction connection from the cylinder to the manifold at a point between the throttle valve and the engine, a spring for forcing the piston one way, said piston giving the fuel valve a movement in the other direction when pulled by the suction and adjustable connections between the piston and the fuel valve for operating the latter, said connections having an adjustment to determine the open position of the valve and having another adjustment to impart different degrees of movement to the valve from the movement of the controller piston, substantially as described.

10. In combination, a fuel valve, an air intake, a throttle valve, a cylinder communicating with the manifold at a point between the throttle and the engine, a controller piston working in said cylinder and subjected to the suction in said manifold, a spring for moving the said piston in opposition to the suction, a lever connected with the said controller piston, a link or arm adjustably connected with the lever to derive different degrees of movement therefrom, said link or arm being connected with the fuel valve for operating it and means for adjusting the fuel valve in relation to the said link or arm to determine its initial open position, substantially as described.

11. In combination a main air intake, a fuel valve, an auxiliary air intake, a throttle valve, controlling means for the auxiliary air intake and the fuel valves subjected to suction pull on one side only thereof, that being the suction in the manifold between the throttle valve and the engine, said suction pull tending to close the auxiliary air and the fuel valve, and a spring for operating upon the controlling means in opposition to the suction, whereby said controlling means supplies auxiliary air and more fuel upon the reduction of said suction pull, substantially as described.

12. In a carbureter, a throttle valve, a fuel valve, an air intake directing the air past the fuel valve, an air supplying conduit communicating with the suction pipe at a point between the throttle valve and the engine, and fuel valve actuating means controlled by the suction in said conduit and operatively connected with the fuel valve to cause movement of said fuel valve toward its closed position when said means is subjected to suction.

13. In a carbureter, a throttle valve, an initially open fuel valve, an air intake directing the air past the fuel valve, an air conduit communicating with the suction pipe at a point between the throttle valve and the engine, and fuel valve actuating means controlled by the suction in said conduit and operatively connected with the fuel valve to cause movement of said fuel valve toward its closed position when said means is subjected to suction.

14. In a carbureter, a throttle valve, a fuel valve, an air intake directing the air past the fuel valve, an air conduit communicating with the suction pipe at a point between the throttle valve and the engine, and fuel valve actuating means controlled by the suction in said conduit and operatively connected with the fuel valve to cause movement of said fuel valve toward its closed position and to cause an obstruction of said air conduit when said means is subjected to suction.

JOHN VODICKA.
ADOLPH F. YOUNG.

Witnesses:
ALBERT F. BRIDGE,
ROBERT T. SLOAN.